Jan. 18, 1966 L. E. PENNINGTON 3,229,998
SPLIT SLEEVE PIPE COUPLING
Filed June 17, 1964
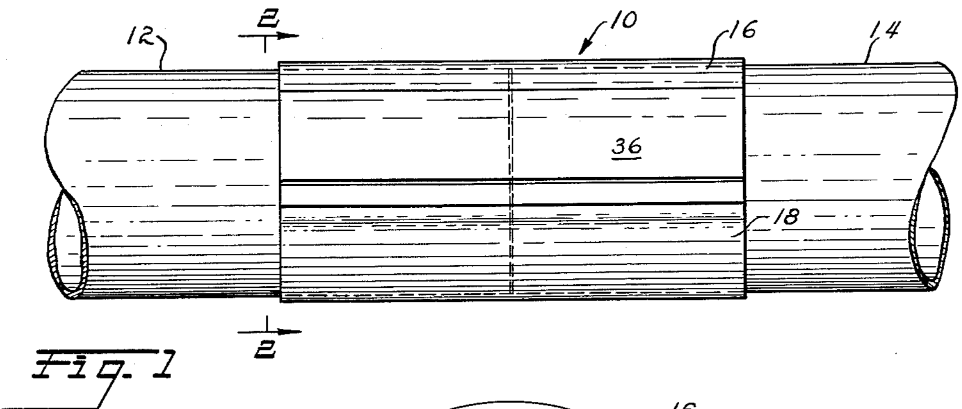
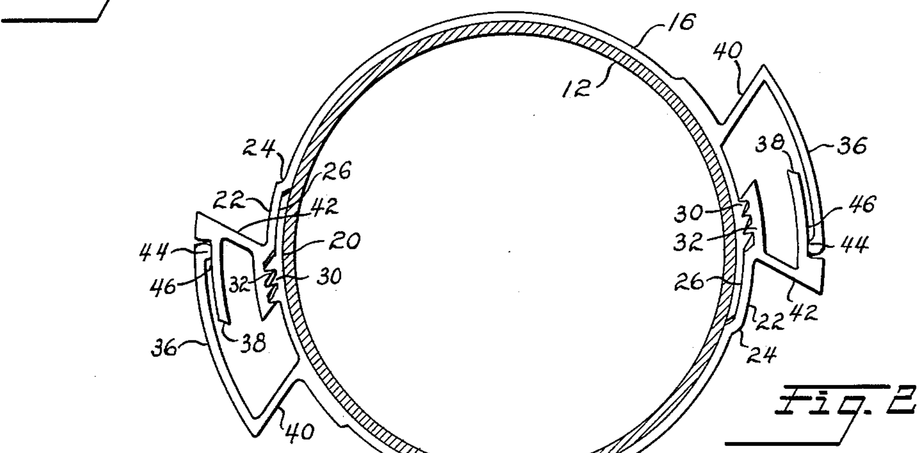
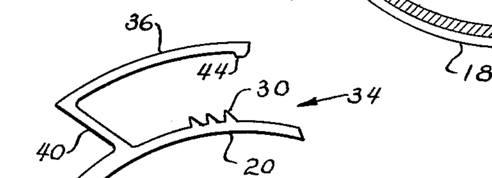
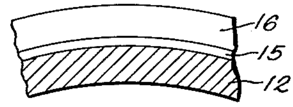
INVENTOR
LOUIS E. PENNINGTON
BY Glenn & Jackson
ATTORNEYS 3,229,998
Patented Jan. 18, 1966

3,229,998

SPLIT SLEEVE PIPE COUPLING

Louis E. Pennington, Chesterfield County, Va., assignor to Reynolds Metals Company, Richmond, Va., a corporation of Delaware Filed June 17, 1964, Ser. No. 377,452
3 Claims. (Cl. 285—419)

The present invention relates generally to improved pipe fittings and methods of assembly, and more particularly, to fittings of the longitudinally split sleeve type for use in effecting threadless pipe couplings and the repair of ruptured or leaking tubular conduits.

The instant application is a continuation in part of my application, Serial No. 20,179, filed April 5, 1960, now abandoned.

Although the principles of the invention are set forth herein as applied to conduits of circular cross-section, the present fitting may be readily incorporated in conduits of various cross-sectional shapes and sizes.

Prior pipe fittings for threadless tubing have for the most part included bulky housings composed of several diverse parts assembled by flanged joints and bolts. Such fittings have required excessive space and laborious installation, and the costs of fabrication, installation and maintenance have been excessive. With the above disadvantages of prior fittings in mind, it is a primary object of the invention to provide a simple, effective and economical threadless pipe fitting assembled by the repeated use of a single structural shape which may be readily and continuously produced by extrusion molding.

Another object of the invention is to provide a longitudinally split or divided sleeve type pipe fitting for threadless pipes or tubes having a smooth, substantially continuous bore and wherein adjacent sections or segments are joined by integrally formed fastening means.

A further object of the invention is to provide an arcuate shaped segment for use in pipe fittings having a constant cross section throughout its length and wherein improved integral fastening means are provided for attaching such segment to additional like segments.

Another object of the invention is to provide a pipe fitting for coupling or repairing threadless pipes having a smooth inner bore or surface suitable for confining and shaping adhesive and similar packing materials.

Yet a further object of the invention is to provide a pipe coupling or repair which is compact and may be assembled in limited space with the minimum use of tools.

Another object of the invention is to provide a pipe coupling or repair having improved efficiency in use and which is resistant to mechanical stress and chemical or electrolytic deterioration.

Other objects and a more complete understanding of the invention may be obtained by referring to the following description and claims, taken in conjunction with the accompanying drawing, in which:

FIGURE 1 shows a side view of a composite pipe fitting wherein an embodiment of the present invention employs a pipe coupling;

FIGURE 2 is a cross-sectional end view of the pipe coupling of FIGURE 1 taken along the line 2—2; and FIGURE 3 is an enlarged end view of the arcuate shaped segment forming the basic structural unit of the invention.

FIGURE 4 is an enlarged cross section of a portion of FIGURE 2.

Referring now to the drawing, the invention is illustrated in FIGURE 1 as being incorporated in a pipe coupling 10 employed for joining the adjacent ends of pipes 12 and 14. The pipe coupling 10 essentially consists of a sleeve-like body composed of a plurality of similar arcuate-shaped segments 16 and 18 of generally semi-circular cross section having overlapping longitudinally extending edge portions 20 and 22.

FIGURE 3 more clearly illustrates the cross section of the arcuate shaped segment 16 and the edge portions 20 and 22. The edge portion 22 forms an outwardly displaced connection 24 to provide a rabbet groove 26 for an overlapping joint of adjacent edges 20 and 22 presenting a substantially smooth and continuous inner bore 28 in the manner well known to those skilled in the art.

Edges 20 and 22 have respective rack teeth 30 and 32 integrally formed thereon extending continuously and longitudinally along such edges throughout the length of the pipe coupling. In FIGURE 2 of the drawing such rack teeth are illustrated in full engagement operatively fastening adjacent segments and forming a sleeve type pipe coupling. Although full engagement of the rack type fastening means is preferred, the engagement of only one or two teeth will for reasons presently described effect a secure joint. Such partial engagement of the rack teeth permits slight variations in the diametrical dimensions of the fitting and provides tolerance for small deviations in standard pipe sizes.

The rack teeth 30 and 32 are biased into firm engagement by provision of the oppositely directed telescoping channel shaped members or forks 34 and 35. These channel members are formed in part by the longitudinal edge portions 20 and 22, and adjacent each of these edges respectively are arranged outwardly offset circumferentially extending web portions or fork prongs 36 and 38 attached to the edge portions 20 and 22 by obliquely extending connecting webs or shoulders 40 and 42. The terminal end of web portion or prong 36 is provided with an inwardly directed longitudinal head 44 cooperating in the assembled relation of the segments 16 and 18 with the outer surface or the rabbet groove 46 formed in the outer web portion or prong 38. The webs or shoulders 40 and 42 have a degree of resilience and as the channel shaped member 34 is slightly wider than channel shaped member 35, channel shaped member 35 telescopes within channel shaped member 34 whereupon the web portion 38 rides against the head 44 forcing the rack teeth 30 and 32 into engagement. Thus, the web portion 36 constitutes a resilient biasing force firmly and positively clamping the pipe fastening means against accidental displacement.

In assembling a fitting such as a pipe coupling, as illustrated herein, any number of two or more segments may be utilized, and each segment may constitute any desired portion of the circumferential longitudinal sleeve.

In practice the sections may be partially interconnected by hand pressure, however, for drawing the fitting into tight engagement with pipes, a compression tool is desirable. A tool especially well adapted for this purpose comprises a pair of link connected handle members proprovided with wide work gripping surfaces adapted to engage webs 40 and 42 of the telescoping channel shaped members 34 and 35.

In a preferred pipe coupling or repair assembly adhesive material 15, FIGURE 4, may be employed as a coating or packing between the surfaces of the pipe and the interior of the fitting.

Epoxy resin type adhesives have characteristics particularly well suited for use with the pipe fitting of the invention and are preferred for many applications. These resins may be used in flexible or rigid adhesive systems and can be formulated as thermosetting or thermoplastic, and air curing is possible. The use of flexible adhesive systems in pipe couplings and fittings as taught by the invention result in more efficient, mechanically durable, and chemically inert assemblies.

Thus it is to be seen that a combination has been provided in which a plurality of substantially similar segments 16 and 18 have been provided. These are overlapped at their edges 20 and 22 by circumferential movement produced by pulling the shoulders 40 and 42 toward each other to produce a relatively short circumferential movement.

This produces a sleeve 10 with a relatively continuous inner surface 28 which is closely contiguous to the continuous outer surface of the pipes 12 and 14. A layer of adhesive may be applied either to the outer surface of the pipes 12 and 14 or to the inner surface 28 of the sleeve before assembly. The adhesive may be tightly and efficiently set or cured by the tightly fitting inner and outer surfaces of the sleeve and pipes.

Each segment has a longitudinal outwardly rabbet edge 22 and a longitudinal substantially straight edge 20 to produce substantially smooth overlapping joints adjacent the offset 24.

Circumferential movement locking means or teeth 30 and 32 on adjacent edges 20 and 22 are interlocked by the circumferential movement produced, for example, by pulling the shoulders 40 and 42 together. A relatively tight fit may be obtained by a proper pinching tool applied to the shoulders 40 and 42.

An outwardly offset, resilient, relatively narrow fork prong 46 is produced on the rabbet edge 22, and an outwardly offset, resilient, relatively wide fork prong 36 is produced on the substantially straight edge 20. The prong 36 resiliently inwardly engages part of the rabbet edge 22, such as the adjacent narrow fork prong 38, as shown in FIGURE 2, of an adjacent segment to hold the adjacent locking means or teeth 30, 32 together in firmly interlocked condition.

The resilient shoulders 40 and 42 are provided on the segments 16 and 18 to pull the segments together in interlocking engagement. The shoulders 40 and 42 may form parts of the fork prongs 36 and 38.

The segments 16 and 18 may be extrusion members. That is, the segments 16 and 18 may be produced by extruding relatively long extrusions of aluminum and the like and then transversely severing the extrusion to desired lengths.

Although the present fitting is preferably fabricated of aluminum by extrusion molding, the device may be readily formed of any metallic, plastic or similarly desirable material and in any suitable forming process.

Although the invention has been described with a degree of particularity, it is understood that the present disclosure has been made by way of example and that changes in the details of construction and the combination and arrangement of parts may be resorted to without departing from the spirit and the scope of the invention as hereinafter claimed.

While the form of the invention now preferred has been disclosed as required by the statutes, other forms may be used, all coming within the scope of the claims which follow.

What is claimed is:

1. A longitudinally divided pipe fitting for encompassing conduits said pipe fitting having two similar overlapping separate segments, each segment comprising a generally arcuate shaped body having two longitudinal edges substantially like the longitudinal edges of the other of said segment, a rabbet on the interior surface of said body along one of said edges to permit a substantially smooth joint at the overlapping of segments, the other of said edges being a continuously smooth edge, outwardly offset circumferentially extending fork prong portions adjacent said respective edges attached to said body by connecting compression tool engageable shoulders, each of said edges with its adjacent circumferential prong forming a channel member extending longitudinally of the edge, the channel member adjacent said rabbet being telescopically receivable and clamped within an oppositely directed channel member similar to said other channel member carried on a separate adjacent segment, by circumferential relative movement between said segments produced by the action of said compressing tool on adjacent ones of said shoulders, and interengaging fastening means carried by the overlapped surfaces of said longitudinal segment edges.

2. In combination, a plurality of substantially similar segments to be circumferentially overlapped by circumferential movement to form a sleeve for sealing a conduit construction and the like, each segment having a longitudinal outward rabbet edge and a longitudinal substantially straight edge to produce substantially smooth overlapping joints, one direction circumferential movement locking means on said edges to interlock one direction circumferential movement locking means on adjacent edges by opposite relative circumferential movement of said adjacent edges, an outwardly offset, resilient, relatively narrow fork prong on said rabbet edge, an outwardly offset, resilient, relatively wide fork prong on said straight edge which relatively wide fork prong is relatively wide with respect to said relatively narrow fork prong, said relatively wide fork prong resiliently inwardly engaging an adjacent oppositely directed narrow fork prong on a rabbet edge of an adjacent segment to hold the adjacent locking means in firmly interlocked condition, said rabbet edge and said straight edge on each of said segments being substantially like every other respective rabbet edge and straight edge on every other segment, said wide and narrow fork prongs being wide and narrow in a plane perpendicular to the longitudinal axis of said sleeve.

3. A combination according to claim 2 in which shoulders are provided on said segments to cooperate with a tool for circumferentially drawing said segments together into firm interlocking engagement, said shoulders forming the supporting joints between said fork prongs and said edges.

References Cited by the Examiner

UNITED STATES PATENTS

| | | | |
|---|---|---|---|
| 162,725 | 4/1875 | Weil | 24—20 |
| 210,560 | 12/1878 | Robertshaw | 285—252 X |
| 712,765 | 11/1902 | Cole | 285—420 X |
| 1,261,221 | 4/1918 | Dutcher | 24—20 |
| 1,302,944 | 6/1919 | Maclaren | 285—419 |
| 2,749,155 | 6/1956 | Kinghorn | 285—369 X |
| 2,828,800 | 4/1958 | Hopkins | 285—292 X |

CARL W. TOMLIN, *Primary Examiner.*

THOMAS F. CALLAGHAN, *Examiner.*